(12) United States Patent
Yamamoto (10) Patent No.: US 8,279,780 B2
(45) Date of Patent: Oct. 2, 2012

(54) VIDEOCONFERENCING SYSTEM USING NETWORK

(75) Inventor: Yuzo Yamamoto, Ibaraki (JP)

(73) Assignee: Japan Atomic Energy Agency, Ibaraki (JP)

( * ) Notice: Subject to any disclaimer, the term of this patent is extended or adjusted under 35 U.S.C. 154(b) by 775 days.

(21) Appl. No.: 12/488,090

(22) Filed: Jun. 19, 2009

(65) Prior Publication Data
US 2010/0007713 A1 Jan. 14, 2010

(30) Foreign Application Priority Data
Jul. 9, 2008 (JP) ................................ 2008-178664

(51) Int. Cl.
*H04L 12/16* (2006.01)
(52) U.S. Cl. .................. 370/270; 348/14.08; 348/14.11; 370/260; 370/261; 709/203; 709/206; 709/219; 709/224; 709/229
(58) Field of Classification Search .... 348/14.01–14.16; 370/259–271, 351–356; 709/201–207, 217–248
See application file for complete search history.

(56) References Cited

U.S. PATENT DOCUMENTS
6,128,649 A * 10/2000 Smith et al. .................. 709/217
2009/0089683 A1* 4/2009 Thapa .......................... 715/756

FOREIGN PATENT DOCUMENTS
JP 7-162823 6/1995
JP 2008-187659 8/2008
* cited by examiner Primary Examiner — Hemant Patel
(74) Attorney, Agent, or Firm — Wenderoth, Lind & Ponack, L.L.P.

(57) ABSTRACT

Dual (redundant) operation support servers are used to improve the reliability of a video conferencing system and ensure the stability of communication. Switching automatically one operation support server to another enables a video conference to be smoothly continued without interruption. Multiple operation support servers are provided, each including a synchronization function which synchronizes site connection information and live camera information between the operation support servers and prevents an operation support server in a standby state from writing live camera information in a folder for each site. Each site PC 14 includes an automatic server change function which, when an operation support server 11 in service fails, switches connection from the operation support server 11 to an operation support server 12 in a standby state. When the operation support server in service fails, the operation support server in a standby state writes live camera information into a folder for each site and each site PC changes connection from the operation support server that was in service to the operation support server in a standby state.

3 Claims, 6 Drawing Sheets

START CONFERENCE

WRITE LIVE CAMERA INFORMATION INTO FOLDERS
FOR PARTICIPATING PC SITES

CHANGE PARTICIPATING SITE

WRITE LIVE CAMERA INFORMATION INTO SITE FOLDER
FOR NEW PARTICIPATING SITE PC

DELETE LIVE CAMERA INFORMATION FROM
SITE FOLDER FOR LEAVING SITE PC

UPDATE LIVE CAMERA INFORMATION OF SITE FOLDER
FOR EACH PARTICIPATING SITE PC

CLOSE CONFERENCE

DELETE LIVE CAMERA INFORMATION FROM SITE FOLDERS
FOR ALL PARTICIPATING SITE PCS

FIG. 6

VIDEOCONFERENCING SYSTEM USING NETWORK

BACKGROUND OF THE INVENTION

1. Field of the Invention

The present invention relates to a videoconferencing system that uses an existing network to allow bidirectional connections to be readily and quickly established among PCs at multiple sites. In particular, the present invention relates to a videoconferencing system on a network that includes dual (multiplexed) operation support servers to improve reliability and enables quick and automatic switching to an operation support server in a standby state if an operation support server in service fails, thereby allowing a video conference to be smoothly continued without interruption with improved usability.

2. Description of the Related Art

As is commonly known, a videoconferencing system allows multiple remote sites to send and receive video and audio to conduct a video conference while viewing the video displayed on monitor screens. Videoconferencing systems widely used today typically use telephone lines. Once a call is established over a telephone line, video and audio can be sent and received and an image is displayed and audio is heard. However, a basic function of communication over a telephone line is one-to-one bidirectional communication. Therefore, conventionally a multipoint communication control unit is interposed and is connected to each site terminal through a telephone line.

As a multipoint communication control unit, there is such a control unit for example as has a function that, by a support of hardware, generates a composite video-audio information by combining pieces of video and audio information individually sent from site terminals at different sites and returns the composite video-audio information to the site terminals to permit each site terminal to display reduced images of the other site terminals (see Japanese Patent Laid-Open No. 7-162823). This function implements a pseudo one-to-many bidirectional communication by using one-to-one bidirectional communication. In addition, the videoconferencing system allows site terminals to basically flexibly participate in and leave a video conference. This is possible because the multipoint communication control unit connects and disconnects a telephone line to allow a site terminal to participate in and leave the conference. However, the videoconferencing system requires high equipment cost. In addition, since the system essentially uses telephone lines, telephone line charges and therefore communication cost increase with the distance between the multipoint communication control unit and the sites. Furthermore, because of a limited bandwidth, the video quality is low and it is difficult to smoothly transmit video and audio.

Therefore, a videoconferencing system has been developed that uses an existing network, instead of telephone lines. In a videoconferencing system using a network, each site terminal does not require high equipment cost because the site terminal requires only a personal computer (PC) including a camera (video input device) and a microphone (audio input device), and also communication cost can be significantly reduced. Moreover, such a system is basically capable of one-to-many bidirectional communication and, thanks to a broad bandwidth, achieves high video quality and smooth transmission of video and audio.

However, there is a problem that each individual site PC that is going to participate in a video conference has to perform operation for connecting to many other site PCs and open a number of viewers required. A user who wants to hold a video conference should provide information such as the start time of the video conference and connection information for site PCs that will participate in the video conference to the site PCs in advance by e-mail or otherwise, and the individual site PCs simultaneously perform operation for connecting to the other site PCs at that start time. The video conference cannot be started until this preparatory operation has been completed. The operation for interconnection between site PCs before starting a video conference is considerably troublesome. There is an upper limit of four sites that can participate in a video conference at a time in the present circumstances. Another problem with such a videoconferencing system is that it is difficult for an additional site to participate in an ongoing video conference or for a site PC participating in a video conference to leave the ongoing video conference. In order for a site PC to participate in or leave an ongoing video conference, the other site PCs have to individually perform operation for connecting to or disconnecting from the site PC that is going to participate in or leave the video conference.

As a technique to solve these problems, the present inventors have proposed in the past a videoconferencing system that uses a network, in which an operation support server on a network includes a site information management function which stores and manages connection information for all site PCs capable of participating in a video conference and a connection support function which generates live camera information for each site that describes a destination to which a connection is to be automatically established and writes the live camera information in a folder for each site in response to a video conference start request and deletes live camera information in response to a conference close request. Each site PC includes a monitor function which periodically accesses a folder for its own site on the operation support server to check to see whether there is live camera information and a connect function which, when there is live camera information, reads the live camera information, enables transmission to each site described in the live camera information and opens as many viewers as the number of the sites to enable reception from the sites, and when live camera information is deleted, stops transmission to the sites and terminates the associated viewers for the sites. Each site PC reads live camera information written by the operation support server in a folder for the site and automatically connects to and disconnects from the other site PCs and automatically opens and closes a viewer to start and close a video conference. (Japanese Patent Application No. 2007-21711).

Since the videoconferencing system described above uses a network, each site terminal may be a simple PC equipped with a camera and a microphone; the system therefore has an advantage in that the equipment cost is low and communication cost can be significantly reduced. In addition, since the system stated above is basically capable of performing one-to-many bidirectional communications and the system's bandwidth is broad, the system has another advantage in that the video quality is high and video and audio can be smoothly transmitted. Furthermore, since what is required of each site PC is simply to monitor the folder of its own use in the operation support server constantly with sending and receiving enabled corresponding to the live camera information described therein and to open a needed number of viewers, interconnection can be automatically established enabling a video conference among multiple sites to be readily and quickly opened and closed even if the number of sites that participate in a video conference increases. Moreover, operation for an additional site PC to participate in an ongoing video conference or for a participant site PC to leave an ongoing video conference (and associated operation for connecting or disconnecting communication and opening or closing a viewer) can be automatically and quickly performed simply by changing live camera information in each site folder on the operation support server. Therefore, the video conference can be smoothly conducted as if participants were in the same room. Thus, the videoconferencing system has considerably advantageous effects as compared with the conventional-art system.

However, the videoconferencing system has room for improvement in terms of the reliability of the system and the stability of communication among others, because the system basically relies on the use of a single operation support server. In this connection, a dual-system of the operation support server is conceivable to improve the reliability. However, providing accessible servers simply in plural can worsen operability and impair inherent advantages of the videoconferencing system if such provision of plural accesses cause a video conference to be interrupted or cause switching from one operation support server to another to require much time and labor.

Objects to be achieved by the present invention are to improve the reliability of a system and ensure the stability of communication by using dual (redundant) operation support servers and to enable a video conference to be smoothly continued without interruption by automatically switching from one operation support server to another, thereby minimizing impediments to the progress of the conference.

SUMMARY OF THE INVENTION

According to the present invention, there is provided a videoconferencing system using a network in which an operation support server on the network includes a site information management function which stores and manages connection information for all site personal computers capable of participating in a video conference and a connection support function which, in response to a conference start request, generates live camera information for each site describing a destination to which connection is to be automatically established to write the live camera information in a folder for each site and deletes the live camera information in response to a conference close request; each site personal computer includes a monitor function which periodically accesses the folder for its own site on the operation support server to check to see whether there is live camera information and a connect function which, when there is live camera information, reads the live camera information, enables transmission to each site described in the live camera information and opens as many viewers as the number of the sites to enable reception from the sites, and when live camera information is deleted, stops transmission to the sites and terminates the associated viewers for the sites; and each site personal computer reads live camera information written by the operation support server in the folder for each site and automatically connects to and disconnects from personal computers at the other sites and thereby automatically opens and closes viewers to start and close a video conference, wherein: a plurality of operation support servers are disposed; and a synchronization function, which synchronizes the site connection information and live camera information between the operation support servers and prevents an operation support server in a standby state from writing live camera information in a folder for each site, is provided; and each site personal computer includes an automatic server change function which switches connection from an operation support server in service to an operation support server in a standby state when the operation support server in service fails; and when an operation support server in service fails, an operation support server in a standby state writes live camera information into the folder for each site and each site personal computer changes connection from the operation support server that was in service to the operation support server in a stand by state.

Preferably, the plurality of operation support servers are disposed severally on a LAN different from the other LANs, and when live camera information is changed, a first operation support server in service writes required live camera information into a file for each site and sends the changed live camera information to a second operation support server in a standby state; and when communication with the first operation support server is lost, the second operation support server determines that the first operation support server has failed and writes the latest live camera information for each site into the folder for each site on the second operation support server; and when each site personal computer is unable to access the file for its own site on the first operation support server, the site personal computer determines that the first operation support server has failed and accesses the file for its own site on the second support server while keeping a viewer open.

Preferably, even if the first operation support server recovers from a failure while the second operation support server is in service, the second operation support server performs a process for synchronization with the first operation support server without switching and maintains the video conference until the second operation support server fails or the video conference is closed, and when a process for closing the video conference is completed, destination server information at each site personal computer is reset to the first operation support server.

Since multiple operation support servers are disposed and site connection information and live camera information are synchronized between the operation support servers in the videoconferencing system according to the present invention, the reliability of the system can be improved and the stability of communication can be maintained by the server redundancy. In addition, by limiting the writing of the live camera information to the site folders only to the in-service operation support server (an operation support server or servers in the standby state are prevented from writing live camera information in the site folders), a server that is actually supporting the operation of a video conference can always be confined only within one particular server. If a first operation support server fails, each site PC immediately switches to a second operation support server because each site PC includes the automatic server change function which controls connection to each operation support server, so that each site PC can access the second operation support server. Therefore, a video conference can be continued without interruption and impediments to the progress of the conference can be minimized. In particular, if the multiple operation support servers are disposed on different LANs, the reliability can be further improved. The present system allows operation support servers to be readily disposed on different LANs.

DETAILED DESCRIPTION OF THE PREFERRED EMBODIMENTS

Figure 1:
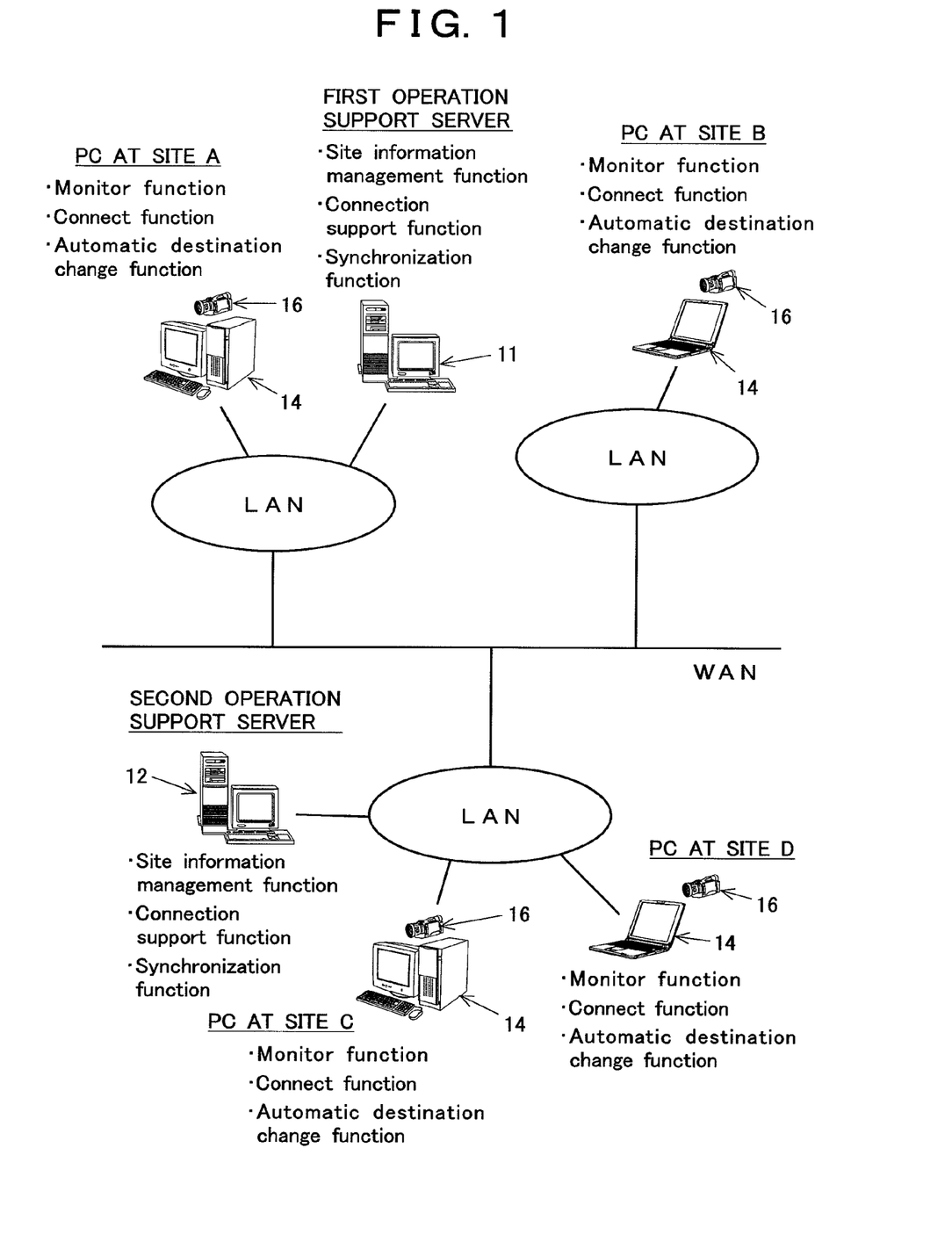
FIG. 1 is a view of overall configuration of an embodiment of a videoconferencing system according to the present invention.

FIG. 1 shows a view of overall configuration of one embodiment of a videoconferencing system according to the present invention. Many PCs are connected to each LAN which is connected to a WAN. For example, office or regional LANs of a company or organization are interconnected by a WAN. Some of the PCs act as site PCs of the venue when a conference is held. In the present invention, multiple operation support servers are disposed on different LANs. It is assumed here that a first operation support server 11 and a second operation support server 12 are used, which are disposed on different LANs. Four PCs 14 are shown as being site PCs that participate in a video conference. The site PCs 14 are labeled with symbols A through D for convenience to distinguish them from each other. Any number of site PCs can participate in a video conference.

The operation support servers 11 and 12 are equipped with an operation support program including at least a site information management function, a connection support function, and a function for synchronization between different operation support servers. The site information management function is a function that stores connection information for all site PCs that can participate in a video conference (for example, various information required for connecting and identifying sites, such as IP addresses, IDs, and passwords) on a hard disk and manages addition, deletion, and alteration of such information. The connection support function is a function that generates live camera information for each site that describes sites to which connections are to be automatically established in response to a request to hold a conference (live cameras text data for each site: live_cameras.txt), writes the live camera information into a folder for each site, and deletes live camera information from the folder for each site in response to a request to close the conference. The synchronization function is a function that synchronizes site connection information and live camera information between the operation support servers and prevents a standby operation support server from writing live camera information into the folders for the sites. The operation support servers are further equipped with other functions such as a function of displaying a video conference portal screen that can be viewed using a Web browser and a function of allowing a user to perform operation on the portal screen such as a mouse click for selecting a site at which a video conference is to be held and a function of setting and managing sites.

On the other hand, each site PC 14 is equipped with means for outputting video and audio (a display and loudspeakers) and has means for inputting video and audio (a camera and a microphone) 16 connected. Further, each site PC 14 is equipped with a connection program that includes a monitor function which periodically accesses its own site folder on an operation support server to check to see whether there is live camera information; a connect function which, when there is live camera information, reads the live camera information, enables transmission to each site described in the live camera information and opens as many viewers as the number of the sites to enable reception from the sites, and when live camera information is deleted, stops transmission to the sites and terminates the associated viewers for the sites; and an automatic server change function which switches connection from the current operation support server to another.

Figure 2:
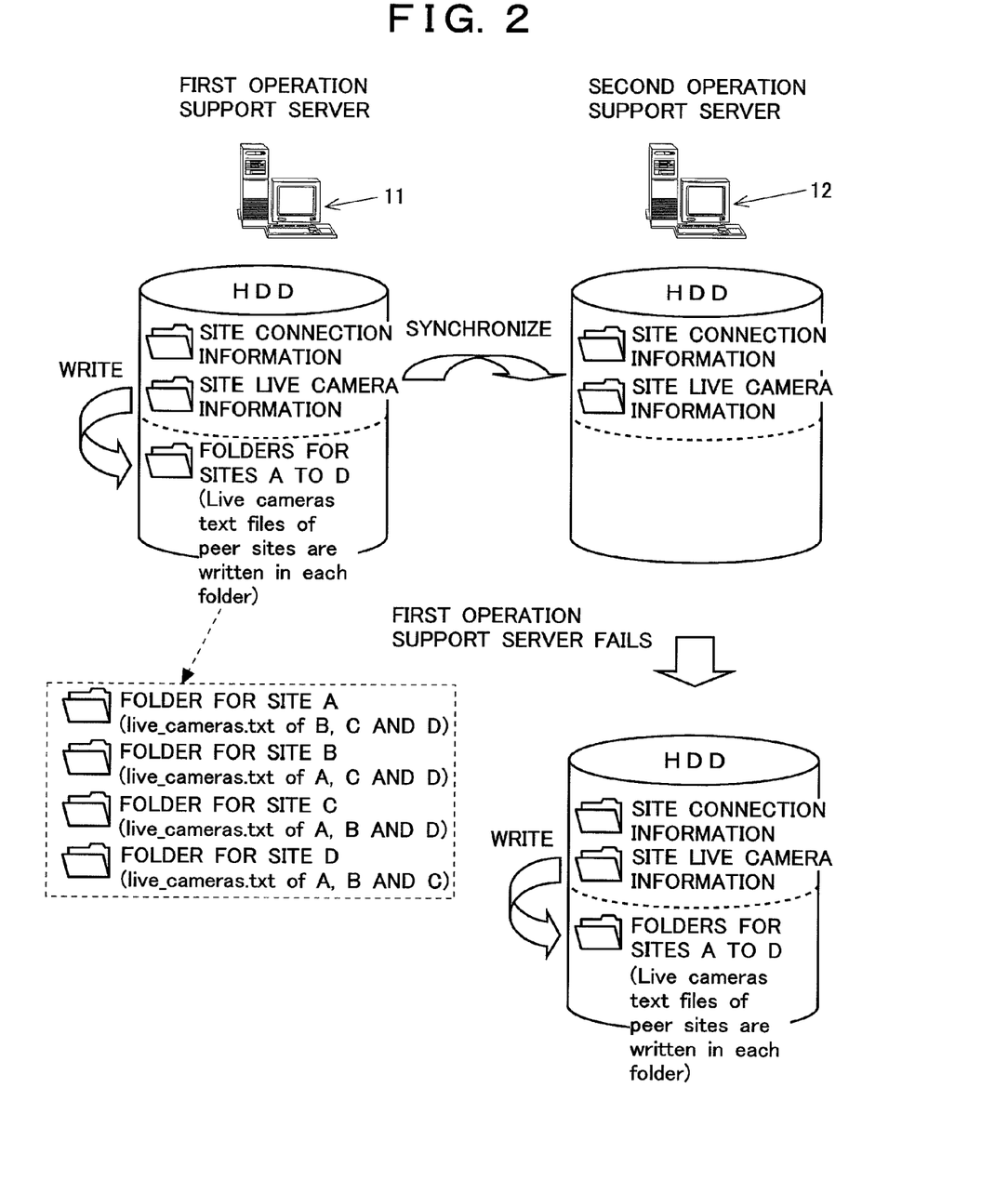
FIG. 2 is an explanatory diagram illustrating a synchronized operation of an operation support server.

When a video conference is started, the first operation support server 11 in service generates and stores live camera information dedicated to each site for each site PC that participates in the video conference on the basis of a video conference start request from any site PC in which multiple participant sites are specified. In the example in FIG. 1, when the PC at site A issues a video conference start request in which four sites A to D are specified, the first operation support server 11 writes live camera information (live_cameras.txt) in which sites to which connection is to be automatically established are described into folders for sites A to D individually as shown in FIG. 2. In particular, in the site A folder, live camera information of sites B, C, and D, site A's counter parties, excluding live camera information of site A, is written. Similarly, live camera information of sites A, C, and D is written in the site B folder, live camera information of sites A, B, and D is written in the site C folder, and live camera information of sites A, B, and C is written in the site D folder. At this time, the second operation support server 12 in a standby state receives and stores the same live camera information dedicated to each site from the first operation support server 11. When a site which participates in the video conference changes, the live camera information for each site on the first operation support server 11 is changed. Accordingly, the folder for each site in which live camera information is written and its content are changed and the live camera information dedicated to each site sent to and stored in the second operation support server 12 is also changed. That is, the connection information for each site and live camera information are kept synchronized between the operation support servers. However, the second operation support server is prevented from individually writing live camera information (live_cameras.txt) for each site in the folders for sites A to D at the second operation support server 12 as long as the second operation support server 12 is in the standby state. Therefore, even if any of the folders for sites A to D at the second operation support server 12 in the standby state is accessed, the folder is empty and no live camera information is available. That is, only the first operation support server 11 is managing the video conference.

Figure 3:
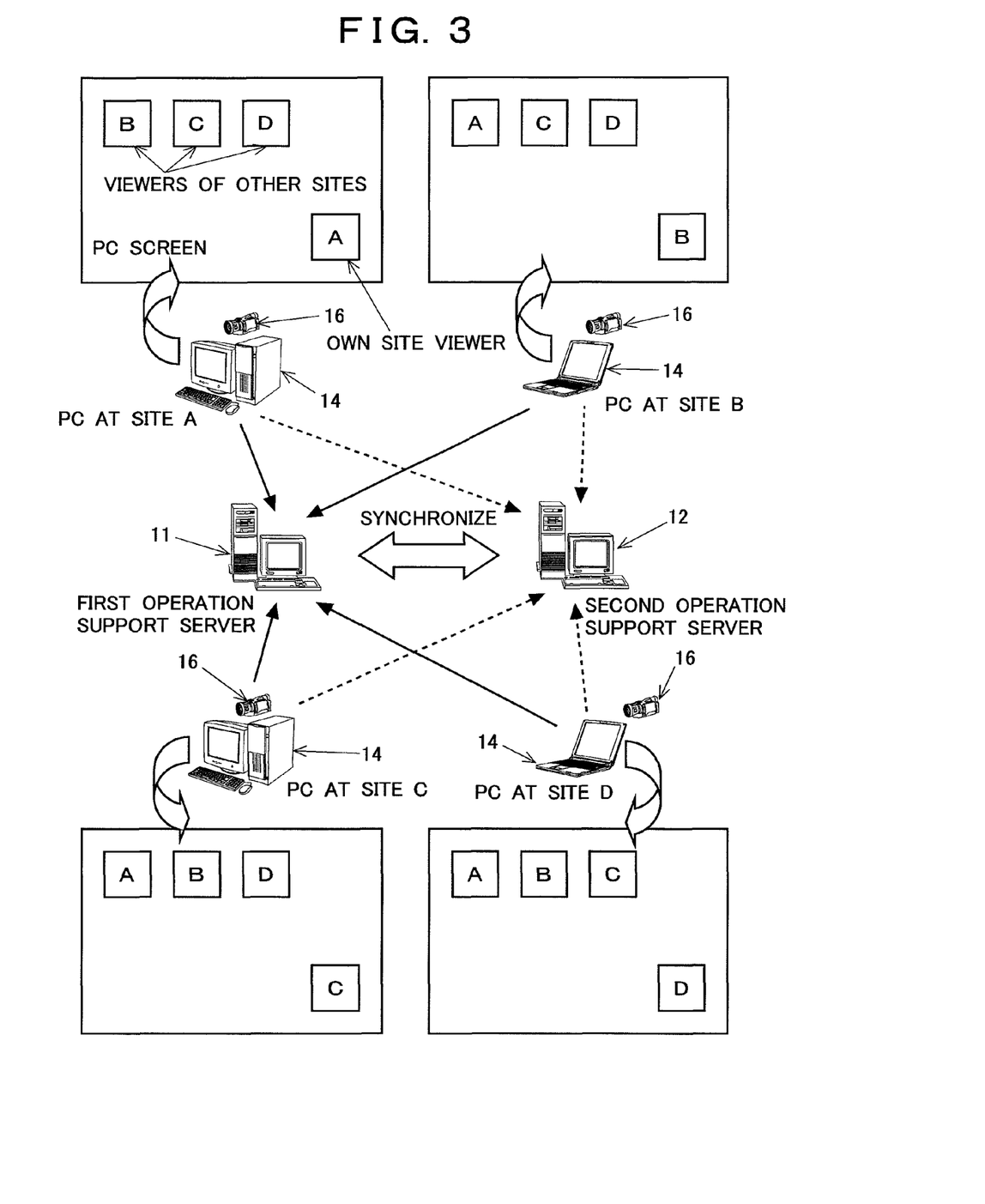
FIG. 3 is an explanatory diagram illustrating a state of access of site PCs to the operation support server.

Each site PC constantly (even during a video conference) monitors its own folder on the first operation support server 11 as shown in FIG. 3 (the site PC repeatedly accesses its own folder at preset time intervals, for example at time intervals of 1 to 20 seconds). Therefore, the site PCs can immediately determine whether there is live camera information (whether live camera information is written in their own folders). The PCs at sites A to D whose live camera information is in their own site folders read their live camera information, enable transmission of video and audio to the other sites described in the live camera information, and open as many viewers as the number of the sites to enable video and audio to be received from the other site PCs (connections are established). The PC at site A opens viewers for the other sites B, C, and D; the PC at site B opens viewers for sites A, C, and D; the PC at site C opens viewers for sites A, B, and D; and the PC at site D opens viewers for sites A, B, and C. In this way, interconnections among the site PCs are completed in a moment and the video conference can be started. The display layout of each site PC is configured so as to open a viewer that displays information about the camera attached to that PC in addition to the viewers for the other site PCs so that video sent from that PC can be confirmed.

While the video conference in the example described above is conducted among four sites, of course a video conference among more sites can be started simply by the site PCs referring to live camera information in their own site folders to automatically complete connections among them by using the same procedure described above.

Here, suppose the first operation support server 11 in service fails for some reason (such failures include a failure on the LAN on which the server 11 is disposed as well as a failure on the server itself). Then, the first operation support server 11 and the second operation support server 12 become unable to communicate with each other. When communication with the first operation support server 11 is lost, the second operation support server 12 determines that a failure has occurred on the first operation support server 11 and writes the currently stored, latest live camera information (live_camera.txt) for each site into the folders for the sites on the second operation support server 12. This is a state where the site PCs can read the content of their site folders (live camera information) when the site PCs access the second operation support server 12. That is, the second operation support server 12 transitions from the standby state to the in-service state.

Figure 4:
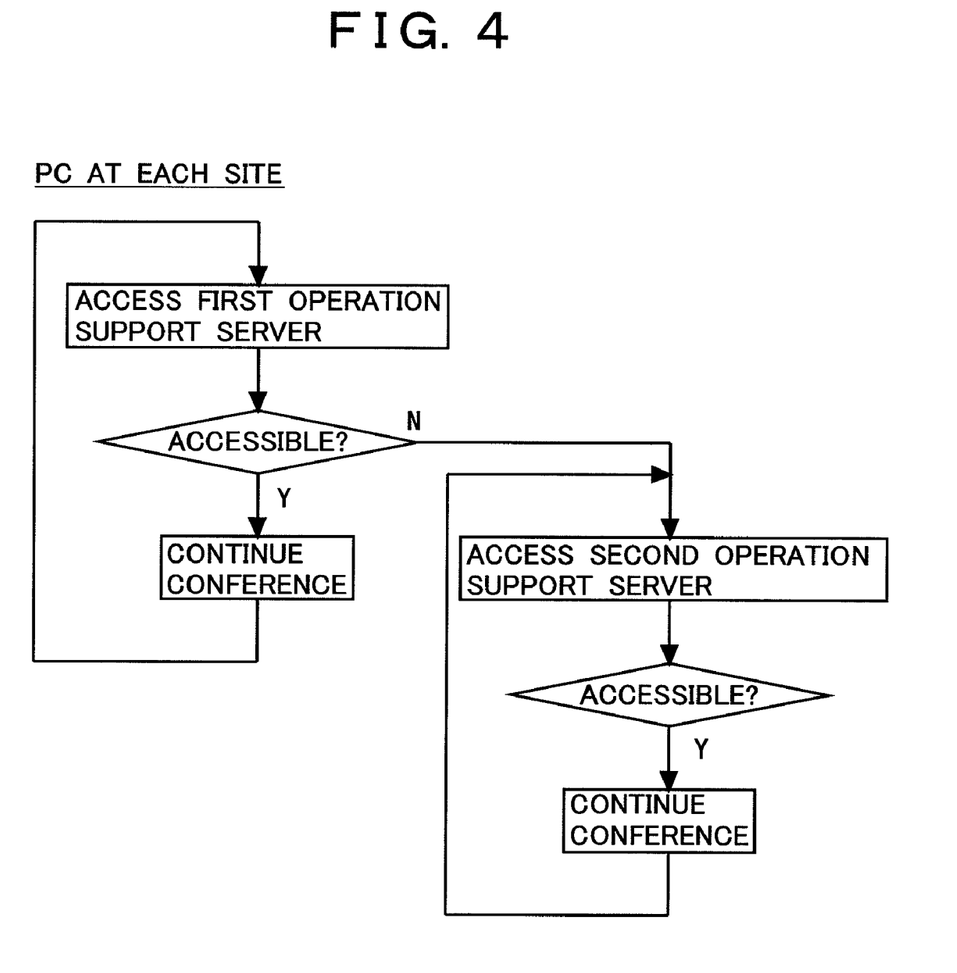
FIG. 4 is an explanatory diagram illustrating an operation for switching the operation support servers.

The operation will be described with reference to the flowchart in FIG. 4. Each site PC attempts to access its own folder on the first operation support server 11. If the site PC can access the folder, the conference is continued by using the first operation support server 11. If the site folder on the first operation support server 11 becomes inaccessible, the site PC determines that a failure has occurred on the first operation support server 11. Then, the automatic server change function of the site PC automatically changes connection from the first operation support server 11 to the second standby operation support server 12 and the site PC accesses its site folder on the second operation support server 12 while keeping the viewers open. Since the second operation support server 12 has written in each site folder on the second operation support server 12 the same live camera information as the live camera information at the first operation support server 11 that had been used, as described above, the site PC can read the live camera information to maintain the connections with the other site PCs and the conference is continued without interruption. Since the operation is automatically performed, the second operation support server 12 is transparent to the participants in the conference and the conference is smoothly continued. The conference with the support of the second operation support server 12 is continued until a failure occurs in the second operation support server 12 or the conference is closed. Upon completion of a process for closing the conference, the destination server information on the site PCs is reset to the first operation support server 11. Accordingly, if the first operation support server 11 has recovered from the failure by the next conference, the next conference will be conducted by using the first operation support server 11.

Figure 5:
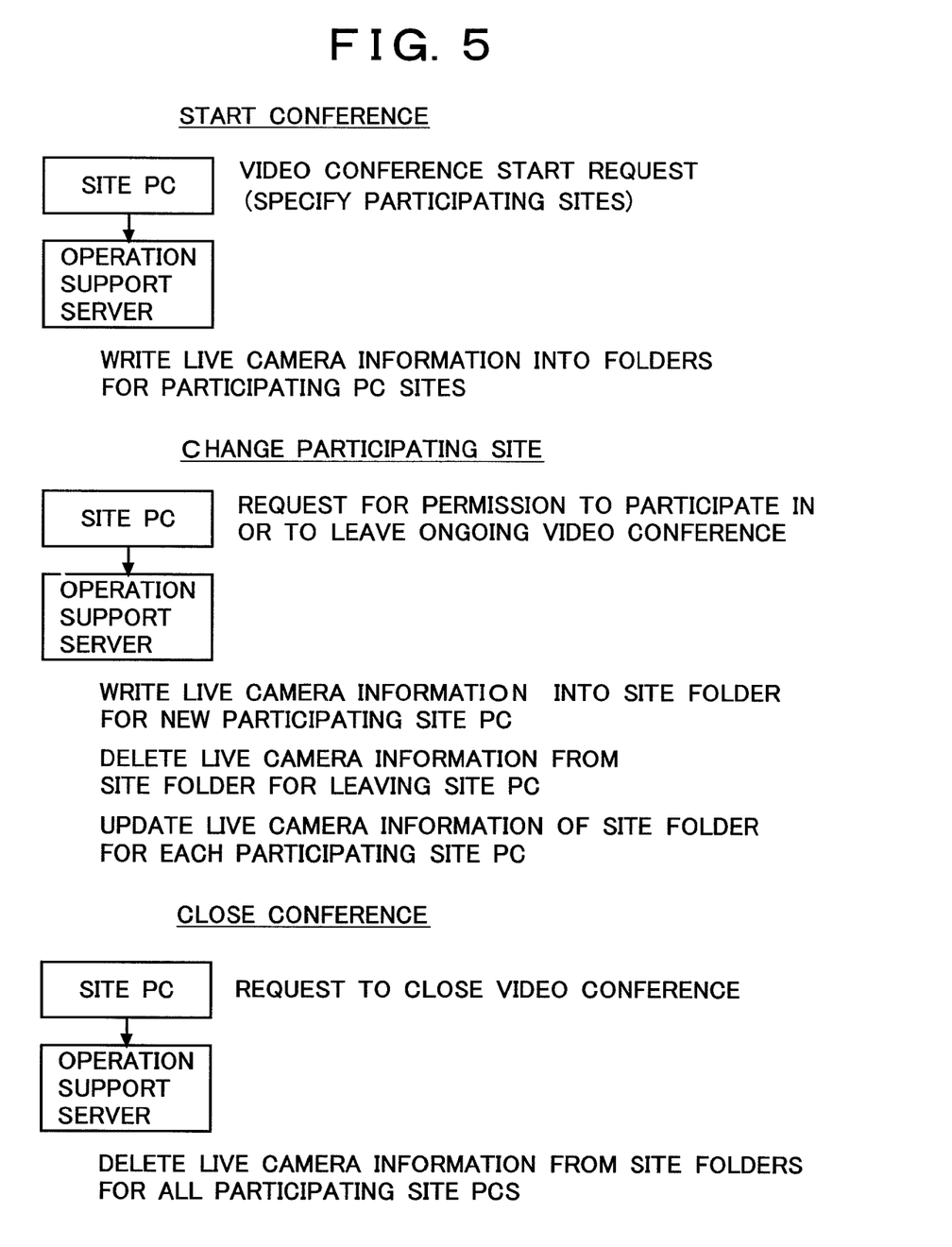
FIG. 5 is an explanatory diagram illustrating a connection supporting operation of the operation support server.

The connection support function by an operation support server is summarized in FIG. 5. A main function of the operation support server is to write (write, alter, or delete) live camera information for automatic connection currently required into the site folder for each site PC that is going to participate (is participating) in a video conference. The same function is included in every operation support server.

A video conference starts in response to a video conference start request issued by any site PC. A user of the site PC accesses a portal screen of the operation support server through a Web browser and specifies participating sites with a mouse click or other action. The operation support server may simply write required live camera information in the site folders of the participating site PCs.

A site participating in a video conference is changed in response to a request for permission to participate in or to leave an ongoing video conference issued from the site PC. Addition or deletion of the site is specified on the Web screen of the operation support server. When a new site is added, live camera information is written into the site folder for the new site PC. When a site leaves a conference, live camera information in the site folder for the leaving site PC is deleted. Live camera information in the site folders of the other participating site PCs is updated accordingly.

A video conference is closed in response to a video conference close request from a site PC. The operation support server may simply delete the live camera information in the site folders of all participating site PCs.

Figure 6:
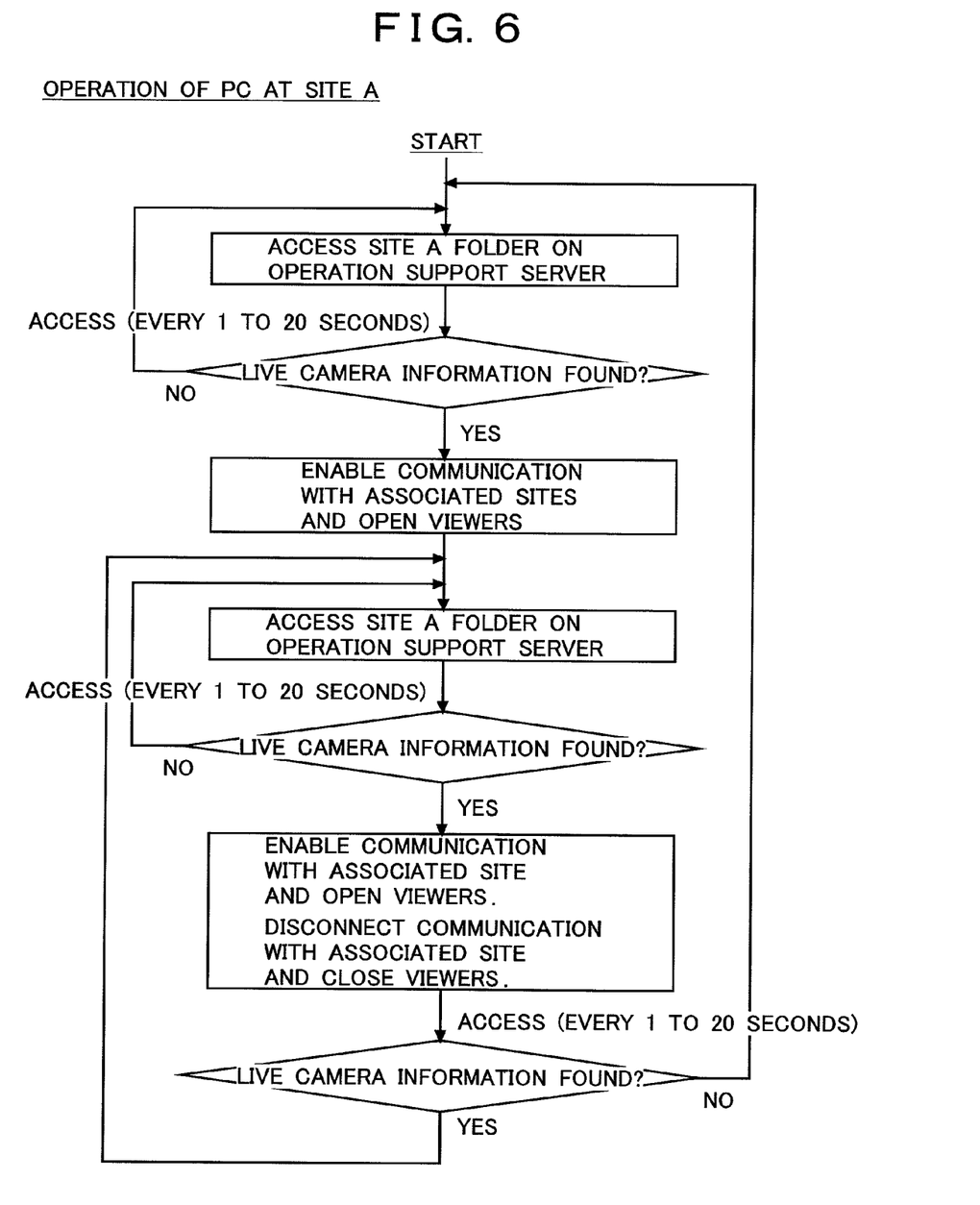
FIG. 6 is a flowchart of operation of each site PC.

FIG. 6 shows a procedure to be performed by a site PC. While the operation to be performed only by the PC at site A with one operation support server is shown, the procedure to be performed by other site PCs is the same as this. It is assumed here that a video conference start request has already been issued to the first operation support server.

When a connection program is activated on the PC at site A, the PC at site A accesses a site folder for site A on the operation support server. The site A PC then checks the folder for live camera information. If no live camera information is found, the site A PC accesses the folder again after a predetermined period of time has elapsed. That is, the site A PC monitors the A site folder on the operation support server at regular intervals (for example every 1 to 20 seconds).

If live camera information is found, the site A PC enables communication with other site PCs with which the site A PC is to communicate and opens viewers of the site PCs. This enables the video conference to be started because each site PC performs the same process. During the video conference, the site A PC repeatedly accesses the folder for site A on the operation support server at regular intervals. If the live camera information has been changed, it means that a site PC has participated or left in mid-conference. Then the site A PC opens a viewer associated with the site to enable communication with the site (participation in mid-conference) or closes a viewer associated with the site to disconnect communication with the site (leaving in mid-conference). If all the live camera information disappears, it means that the video conference is closed, and the site A PC returns to the initial state. If live camera information remains, the video conference is continued and the site A PC repeatedly accesses the folder for site A on the operation support server at regular intervals to monitor whether live camera information is changed or not. If the operation support server becomes inaccessible, the site A PC determines that the operation support server has failed, and switches to access another operation support server and performs the same procedure as that before being switched.

As has been described, the operation support server needs only to manage live camera information in a site folder for each site and each site PC needs only to constantly monitor the folder for its own site. Even if the number of sites increases, interconnection and disconnection through the network can be automatically performed. The site PCs can be any PCs that can connect to the network and therefore a worldwide multipoint video conference including overseas site can also be conducted as well as between domestic sites.

Preferably, each site PC is configured such that it includes a starter function using a physical key and a user uses the starter key for the site PC to activate the connection program. The starter key is typically a USB flash memory in which a protect key is written. With this configuration, the user is authorized to participate in a video conference simply by inserting the starter key in the site PC. The user is prevented from participating in a video conference unless the user uses the starter key. Accordingly, a high level of security can be ensured. In addition, by limiting the number of starter keys to be distributed, a benefit is brought that the number of sites to be connected is physically limited and therefore the network load can be limited.

It was shown that a prototype videoconferencing system according to the present invention was capable of instantaneously establishing connections and opening and closing viewers according to the frequency of access (access time intervals) to folders for the sites even when the number of sites was expanded to about 12 to 16 sites. When a failure was intentionally caused in a first operation support server during a video conference on the prototype system, each site PC automatically switched its connection to a second operation support server 12 and was able to continue the video conference without interruption of presentation of video and audio on the viewers.

Additionally, if a failure occurs on a LAN and communication with a site PC on the LAN (provisionally referred to as failed PCs) is lost, the viewer for the failed PC on the other site PCs that are functioning normally remains open with no video image on its viewer. This means that the other site PCs continue to send video and audio to the failed PC and continue attempting to receive video and audio from the failed PC. Therefore, after recovering from the failure in the network, a video image immediately appears on the viewer associated with the PC.

What is claimed is:

1. A videoconferencing system using a network in which an operation support server on the network includes a site information management function which stores and manages connection information for all site personal computers capable of participating in a video conference and a connection support function which, in response to a conference start request, generates live camera information for each site describing a destination to which connection is to be automatically established to write the live camera information in a folder for each site and deletes the live camera information in response to a conference close request; each site personal computer includes a monitor function which periodically accesses the folder for its own site on the operation support server to check to see whether there is live camera information and a connect function which, when there is live camera information, reads the live camera information, enables transmission to each site described in the live camera information and opens as many viewers as the number of the sites to enable reception from the sites, and when live camera information is deleted, stops transmission to the sites and terminates the associated viewers for the sites; and each site personal computer reads live camera information written by the operation support server in the folder for each site and automatically connects to and disconnects from personal computers at the other sites and thereby automatically opens and closes viewers to start and close a video conference, wherein:

a plurality of operation support servers are disposed; and a synchronization function, which synchronizes the site connection information and live camera information between the operation support servers and prevents an operation support server in a standby state from writing live camera information in a folder for each site, is provided; and each site personal computer includes an automatic server change function which switches connection from an operation support server in service to an operation support server in a standby state when the operation support server in service fails; and when an operation support server in service fails, an operation support server in a standby state writes live camera information into the folder for each site and each site personal computer changes connection from the operation support server that was in service to the operation support server in the standby state.

2. The videoconferencing system using a network according to claim 1, wherein the plurality of operation support servers are disposed severally on a LAN different from the other LANs, and when live camera information is changed, a first operation support server in service writes required live camera information into a file for each site and sends the changed live camera information to a second operation support server in a standby state; and when communication with the first operation support server is lost, the second operation support server determines that the first operation support server has failed and writes the latest live camera information for each site into the folder for each site on the second operation support server; and when each site personal computer is unable to access the file for its own site on the first operation support server, the site personal computer determines that the first operation support server has failed and accesses the file for its own site on the second support server while keeping a viewer open.

3. The videoconferencing system using a network according to claim 2, wherein even if the first operation support server recovers from a failure while the second operation support server is in service, the second operation support server only performs a process for synchronization with the first operation support server without switching and maintains the video conference until the second operation support server fails or the video conference is closed, and when a process for closing the video conference is completed, destination server information at each site personal computer is reset to the first operation support server.

* * * * *